United States Patent [19]
Lee et al.

[11] Patent Number: 6,018,350
[45] Date of Patent: Jan. 25, 2000

[54] ILLUMINATION AND SHADOW SIMULATION IN A COMPUTER GRAPHICS/IMAGING SYSTEM

[75] Inventors: Harry Charles Lee, Maitland; Walter Robert Steiner, Enterprise, both of Fla.

[73] Assignee: Real 3D, Inc., Orlando, Fla.

[21] Appl. No.: 08/741,421

[22] Filed: Oct. 29, 1996

[51] Int. Cl.$^7$ .................................................. G06T 15/50
[52] U.S. Cl. ..................... 345/426; 345/422; 345/430; 345/432; 345/136; 345/138
[58] Field of Search .................. 345/422, 426, 345/431, 432, 136, 137, 138

[56] References Cited

U.S. PATENT DOCUMENTS

| | | | |
|---|---|---|---|
| 4,908,780 | 3/1990 | Priem et al. | 345/114 |
| 5,043,922 | 8/1991 | Matsumoto | 364/522 |
| 5,201,030 | 4/1993 | Carrie | 345/432 |
| 5,377,313 | 12/1994 | Scheibl | 345/422 |
| 5,668,940 | 9/1997 | Steiner et al. | 345/431 |

FOREIGN PATENT DOCUMENTS

| | | |
|---|---|---|
| 0 553 973 A2 | 8/1993 | European Pat. Off. . |
| 0 613 099 A1 | 8/1994 | European Pat. Off. . |
| 2 223 384A | 4/1990 | United Kingdom . |

OTHER PUBLICATIONS

"Computer Graphics: Principles and Practice", Foley et al., Second edition, 1996, pp. 722–723.

*Primary Examiner*—Mark R. Powell
*Assistant Examiner*—Kimbinh T. Nguyen
*Attorney, Agent, or Firm*—Scully, Scott, Murphy & Presser

[57] ABSTRACT

The total illumination of each pixel to be displayed by a real-time computer image generator, is determined for at least one source illuminating a scene to be displayed, by storing in an observer depth buffer data signals representing those portions of object polygons visible to the observer in each pixel of the display, and storing in a source depth buffer, associated with each of the at least one scene-illuminating light sources, data signals representing illumination intensity received by each polygon pixel viewable from that associated source. A data signal, for each displayable pixel in the observer depth buffer, is generated by combining in non-saturating manner the illumination intensity of each light source impingent upon the equivalent pixel in all of the associated source depth buffers.

32 Claims, 11 Drawing Sheets

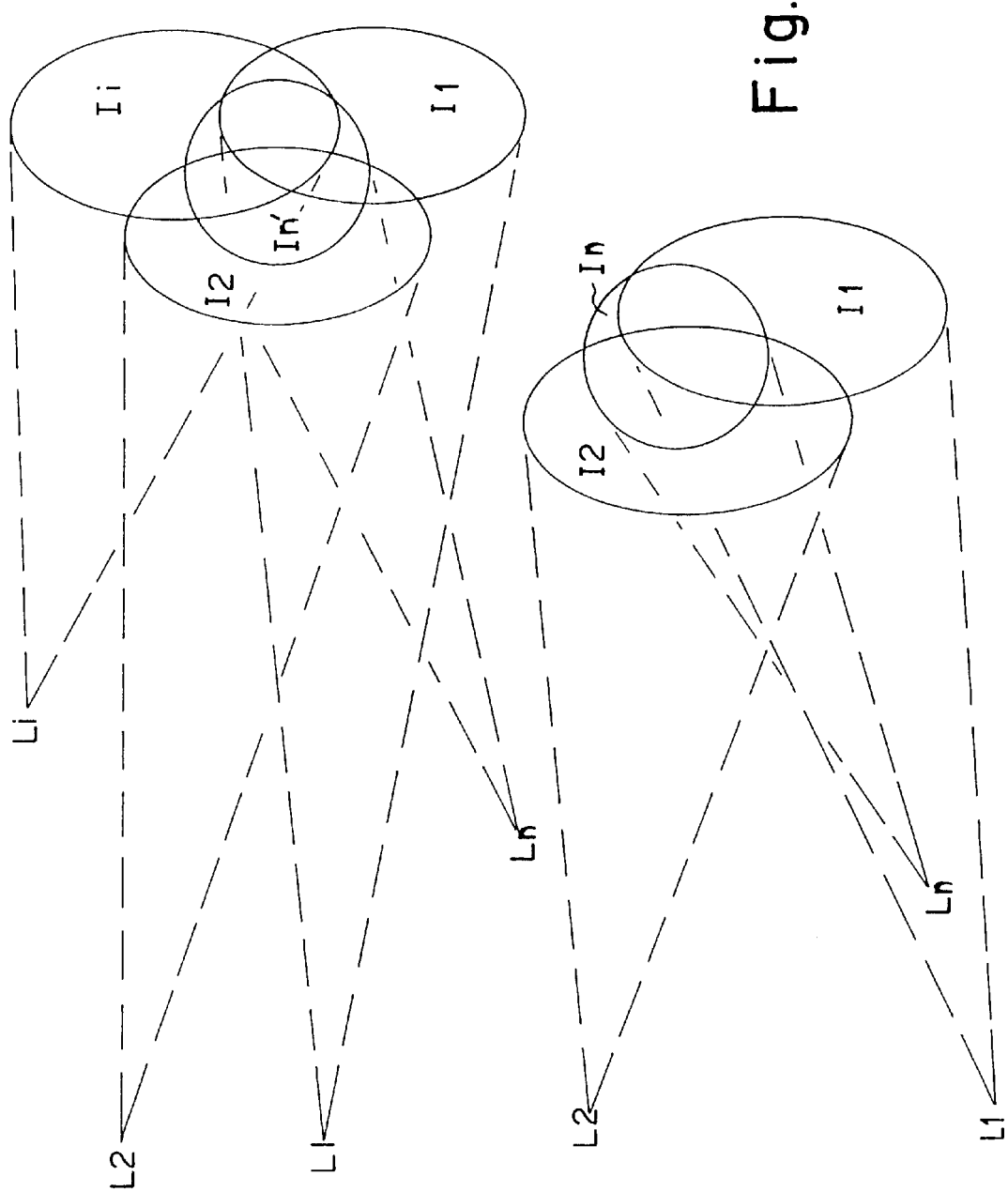

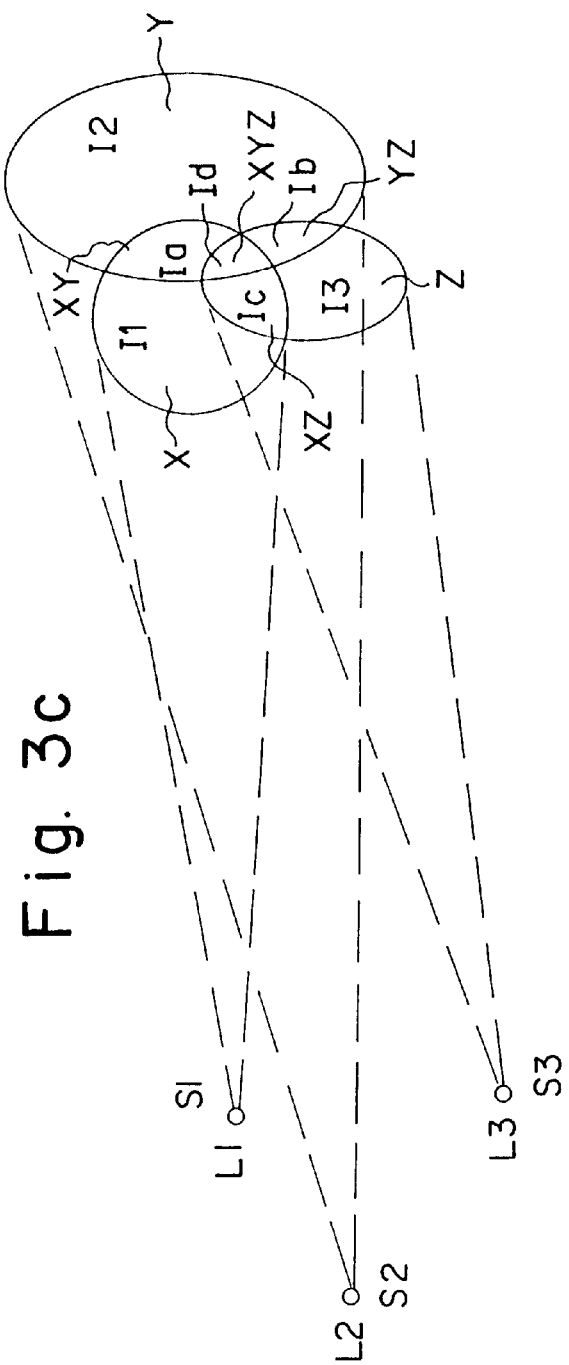
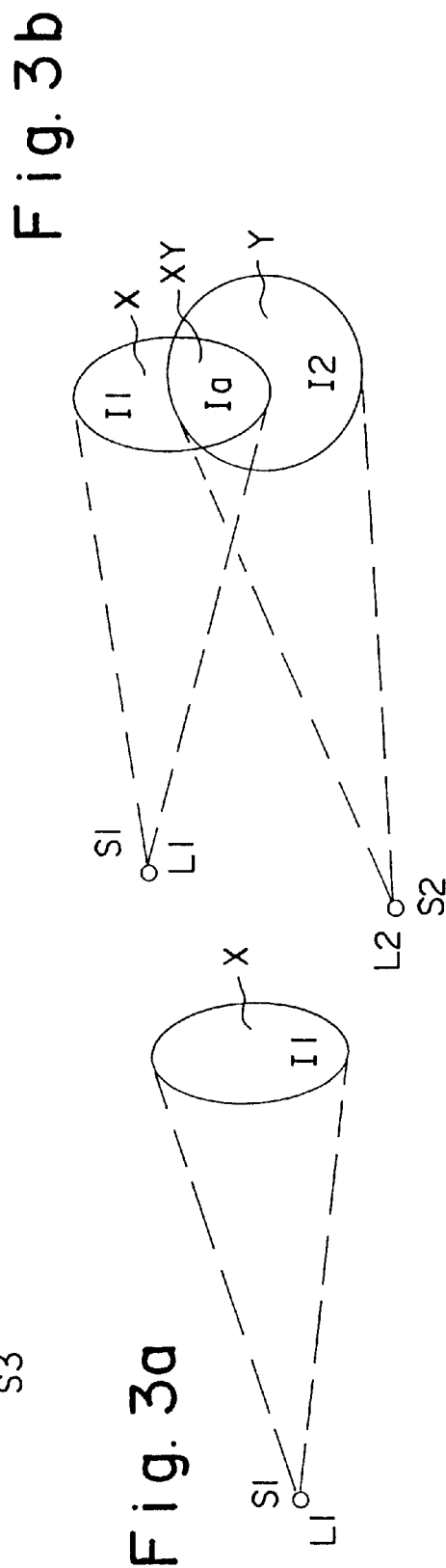
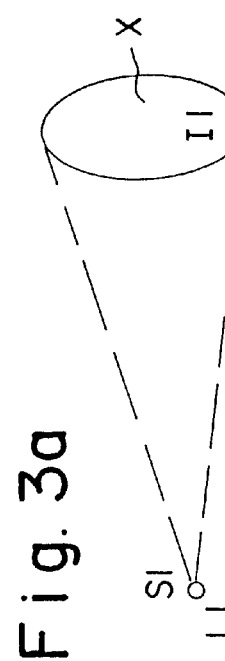
Fig. 3a
Fig. 3b
Fig. 3c

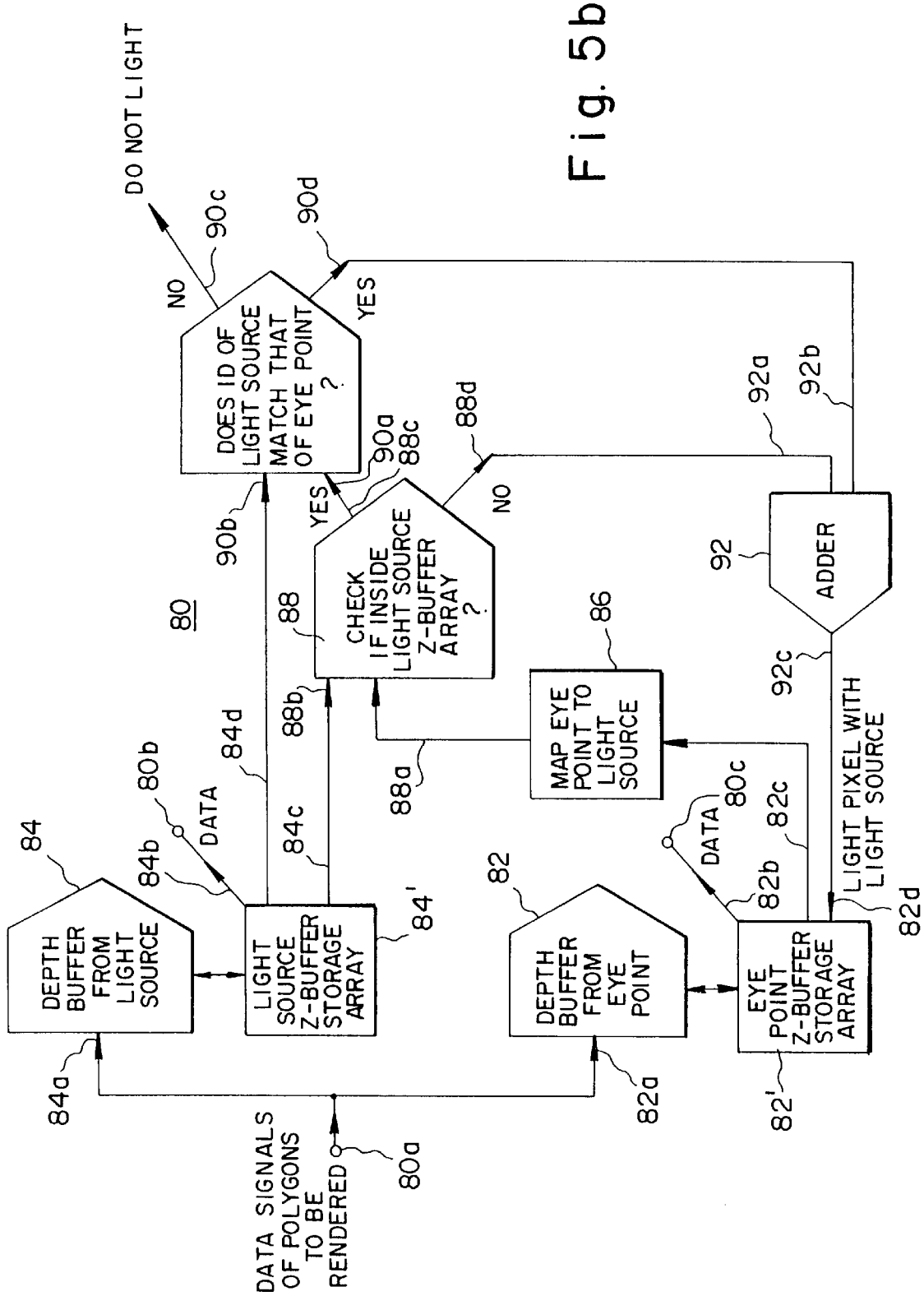

ILLUMINATION AND SHADOW SIMULATION IN A COMPUTER GRAPHICS/IMAGING SYSTEM

FIELD OF THE INVENTION

This invention relates to computer image generation (CIG) or computer graphics systems and, more particularly, to novel multiple illumination source simulation methods and apparatus for use in a display processor for processing of image data describing multi-source illumination of, and anti-aliased shadow generation by, object surfaces involved in display of two-dimensional representations of three-dimensional objects in a real-time imaging system.

BACKGROUND OF THE INVENTION

Real-time computer image systems are designed to provide realistic image reproduction for a wide variety of graphics systems, such as tank/vehicle or flight simulators, action games and engineering work stations. For example, graphics-based simulators are used as training devices which permit a combatant to obtain practice without the necessity of going out into the field and using the actual combat systems. The simulators enable a user, such as a pilot or tank gunner, to maintain and improve his skills without the cost associated with live training. It is thus very advantageous to provide the user with video display realism which is beneficial for training and practice purposes.

In a typical real-time computer image generation system, such as a simulator system, image generation can be broken into three separate processing stages: Controller, Geometry Processor, and Display Processor. These three processing stages or sections each work independently on data representative of or corresponding to one of three consecutive scenes to be displayed. The Controller processes data on a scene or image for a fixed time, which may be either a field time of 16.67 milliseconds or a frame time of 33.3 milliseconds, usually the former, and then passes its processed data to the Geometry Processor. This particular field and frame time corresponds to that time for a typical television format display, i.e., two interlaced fields per frame with thirty frames per second. The Geometry Processor has an equal time to do its calculations and at the end of that time its results are sent to the Display Processor. The Display Processor always processes one interlace field for a video display in one field time. For each time interval, all three processors are kept busy, so that, at any given time, the processors are working on three separate scenes. Each section processes inputs and generates outputs during the interval, so data flows through the three stages in a sequential manner. The computational load is spread out among the specialized processor sections, so this allows new scenes to be displayed each field or frame time, even though the results are delayed three fields or frames.

For example, in a flight simulator system, pilot inputs are received by the Controller and after being processed sequentially by the Controller, the Geometry Processor and Display Processor, the output is sent as a color scene to video displays observed by the pilot in the simulator. The data seen by the pilot starts out as simple control inputs applied to an environment definition and is converted to pixel video display information. In the controller, the pilot inputs are used to calculate the new position and orientation of the aircraft, and from this, a mathematical rotation matrix is calculated that is used to rotate objects from the reference coordinate system to a display coordinate system. Any other information dealing with the aircraft, with the position of targets and with other aircraft is also calculated in the Controller. In some applications, the Controller is a general-purpose computer.

The Geometry Processor reads, from a database, descriptions of objects that are potentially visible in the stored three-dimensional digital representation of the scene. The objects that are read are rotated into display coordinates using the rotation matrices calculated in the Controller. Edges of these three-dimensional objects are clipped by the Geometry Processor if they extend beyond the view window boundaries. The Geometry Processor mathematically projects the three-dimensional data onto the two-dimensional display window. In addition, the Geometry Processor calculates which objects are in front or behind other objects and stores this information in a priority list. Each object processed is made up of individual polygons bounded by straight edges. The priority list contains the order of all polygons in the scene, with the first polygon in the list as the highest priority polygon, and the last polygon in the list has the lowest priority. Whenever two polygons overlap on the display, the higher priority polygon will be visible, and the lower priority polygon will be obscured.

The Display Processor receives the two-dimensional face descriptions, along with face color, face fading information, a face priority list, cell texturing, level-of-detail blending, translucency, curvature shading, etc., and uses this information to output data describing to a color display each pixel in the scene. Each color display in the system is typically made up of 1024 lines of video information, with each line having 1024 individual color dots or pixels. However, other combinations of lines and pixels per line are certainly possible. The Display Processor has to resolve, for each pixel, what the color and luminous intensity of the pixel should be, given that many faces can be present in a pixel, that certain portions of faces may be covered by other faces, and that several light sources may be illuminating each surface portion reflecting light into that pixel. Since there can be 1024 by 1024 pixels in the display, and all these need to be calculated in $\frac{1}{60}$th of a second, the processing load in the Display Processor is very high. To calculate video for a multi-display system (a single system has contained as many as 14 displays), the Display Processor must perform in excess of 10 billion computations per second. Due to the tremendous processing load, a Display Processor can drive only a few displays. In some systems, a single Controller and Geometry Processor can be used to drive several Display Processors with several displays connected to each Display Processor. The Display Processor therefore represents the majority of processing in a real-time computer image generation system, and for this reason most of the effort to improve the capabilities and realism of a CIG system is concentrated in the Display Processor area.

One class of problems has been to process plural sources of illumination, in any one scene, so as to not only prevent saturation of pixel color intensity information, but also to provide shadowing of any visible polygon surface as necessary by each of the several light sources, and to do so in a low-cost, efficient manner which also prevents aliasing of information.

BRIEF SUMMARY OF THE INVENTION

In accordance with the invention, a method for determining, for at least one source illuminating a scene to be displayed, the total illumination of each pixel to be displayed by a display means in a real-time computer image generator, comprises the steps of: storing in an observer depth buffer means data signals representing those portions of object polygons visible to the observer in each pixel of the display; storing in a source depth buffer means, associated with each of the at least one scene-illuminating light sources, data signals representing illumination intensity received by each polygon pixel viewable from that associated source; and generating a data signal, for each displayable pixel in the observer depth buffer means, combining in non-saturating manner the illumination intensity of each light source impingent upon the equivalent pixel in all of the associated source depth buffer means.

A light source subassembly for use in a computer image generator, includes (in addition to a depth buffer means associated with the observer's position) at least one additional depth buffer means, each of which is associated with one of the light sources illuminating the scene to be displayed, for temporarily storing data signals representative of those portions of the scene polygons, displayable in image space, which are illuminated by that source; and light source processor means receiving the data signals from said at least one additional depth buffer means for adjusting the intensity of illumination responsive to those of the totality of light sources illuminating each pixel rendered by the observer's depth buffer and thus displayed to an observer of that scene.

Accordingly, it is an object of the present invention to provide novel apparatus and methods for determining the illumination intensity of each pixel in a computer image system display illuminated by a plurality of illumination sources, including prevent of saturation due to additive effects, generation of shadows responsive to the various sources and anti-aliasing of the resulting illumination information.

This and other objects of the invention will become apparent upon reading of the following detailed description of presently preferred embodiments, when considered in conjunction with the associated drawings.

BRIEF DESCRIPTION OF THE DRAWINGS

FIG. 3 shows a set of N sources simultaneously illuminating a plane, and useful in comprehending the general method of the present invention;

FIGS. 3a–3c are a set of views of different sets of light sources illuminating common surfaces, and useful both in appreciating the problem solved and several aspects of the present invention;

FIG. 3d is a view of a set of light sources after removal of one source, and useful in understanding another aspect of the present invention;

FIG. 5b is a block diagram of one shadow source intensity data processing unit, in accordance with principles of the present invention, for use in a display processor;

DESCRIPTION OF AN ILLUSTRATIVE EMBODIMENT

Figure 1:
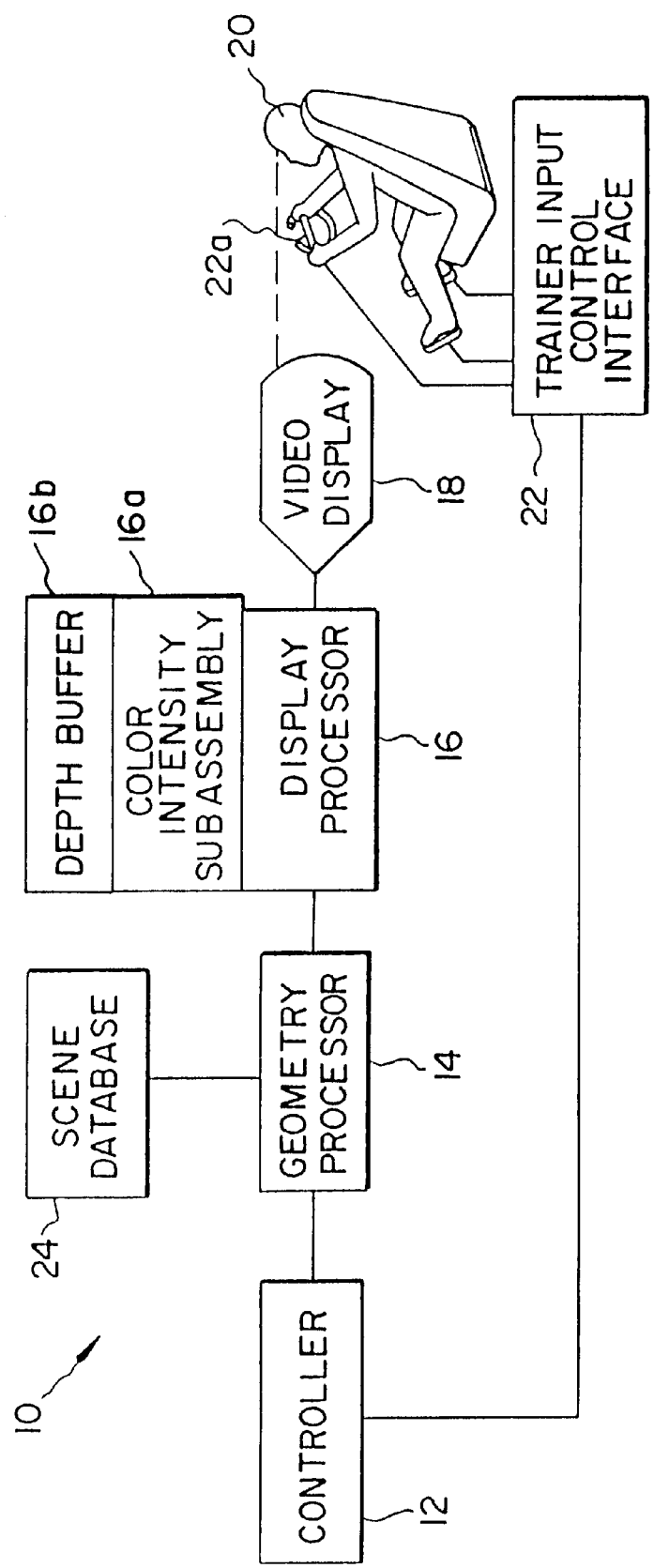
FIG. 1 is a schematic block diagram of a computer image generation (CIG) system in which the apparatus and methods of the present invention may be practiced.

Referring initially to FIG. 1, a functional block diagram of a computer image generation system 10, such as an aircraft cockpit simulation system, is illustrated. For further information as to 3D rendering, the reader is referred to the existing CIG art, including such publications as U.S. Pat. No. 4,727,365, issued Feb. 23, 1988 to Bunker et al., for "Advanced Video Object Generator"; U.S. Pat. No. 4,825, 391, issued Apr. 25, 1989 to D. Merz, for "Depth Buffer Priority Processing For Real Time Computer Image Generating Systems"; U.S. Pat. No. 4,811,245, issued Mar. 7, 1989 to Bunker et al., for "Method of Edge Smoothing for a Computer Image Generation System"; and U.S. patent application Ser. No. 08/292,209, filed Apr. 25, 1989 to Steiner et al., for "Method and Apparatus for Anti-Aliasing Polygon Edges in a Computer Imaging Systems", all of which are incorporated herein in their entireties by reference.

The system includes a Controller unit 12, a Geometry Processor unit 14, and a Display Processor unit 16. The Display Processor unit 16 displays information to a cockpit display window 18 to simulate the movement of the aircraft over a scene. A user 20, such as a game player, pilot-trainee or the like, is linked to the computer image generation system 10 through input control interface 22, which may include a joystick or other control input device 22a. The user's maneuvering action at device 22a is fed to input control interface 22. The input control interface converts the appropriate data (e.g. flight data such as aircraft position, aircraft roll, pitch, and yaw attitude) from the user to the Controller 12.

In the Controller 12, the user inputs are used to calculate a new position and orientation of the controlled object (e.g., the aircraft), and from this, a mathematical rotation matrix is calculated that is used to rotate objects from the reference coordinate system to a display coordinate system, which is well known in the art. Other information dealing with the scene, the position of targets, or other objects is calculated in the Controller. In some CIG/3D graphics systems the Controller unit is a general purpose computer.

The Controller unit 12 is updated periodically by the most recent user-controlled-object (aircraft) orientation. This orientation includes the object aircraft roll, pitch, and yaw, and position from the pilot via the input control interface 22, to the Controller 12. The Controller 12 works on a scene for a field or frame time and then passes data to the Geometry Processor 14.

The Geometry Processor 14 reads from a scene database memory 24, descriptions of objects such as towers, roads, rivers, hangars, etc., that are potentially visible in the stored three dimensional digital representation of the earth. The objects are read from the scene database and are rotated into display coordinates using the rotation matrix calculated in the Controller 12. The Geometry Processor 14 clips all edges which extend beyond the view window boundaries in object space. It mathematically projects the three-dimensional object data onto the two-dimensional display window. Object faces which extend beyond display window boundaries are clipped in two-dimensional image space. The two dimensional objects consist of points, lines, closed convex polygons, or combinations thereof. Each closed convex polygon is known as a face. Thus, each object processed is made up of individual faces, where each face is bounded by straight edges. Once the faces are computed from the three-dimensional objects, in the Geometry Processor 14, the data is passed to the Display Processor 16. In addition, the Geometry Processor 14 calculates, in known manner, which faces are in front or behind other faces and stores this information in a priority list. The priority list contains the order of all faces in the scene where the first face in the list is the highest priority face, and the last face in the list is the lowest priority face. Whenever two faces overlap on a display, the high priority face will be visible and the overlap portion of the low priority face will be obscured. After calculating the priority list, the Geometry Processor 14 calculates the display endpoints of the line segments that bound the two dimensional faces and calculates the coefficients of the line equations that describe the bounding edges. The Geometry Processor 14 calculates the endpoints of each edge and the slope of each edge that describe a bounded face. These data are then passed on to the Display Processor 16.

In FIG. 1, there is shown Display Processor 16 that is used to drive the video display 18. In some systems, a single Controller 12 and Geometry Processor 14 is used to drive more than one Display Processor. The Display Processor 16 represents the majority of processing and hardware in a real-time computer generation system and, for this reason, most of the effort to reduce the size of the hardware and processing time has been concentrated in the Display Processor area. The Display Processor is responsible for processing information to be displayed on video display 18. The Display Processor 16 has to resolve for each pixel in the video display 18 what the color of the pixel should be, given the many faces that can be present in a pixel, and those portions of faces that may be covered by other faces. After resolving the priority conflicts within a pixel, the area of each visible face within the pixel is multiplied by the color of the face, and the sum of all these weighted colors is output as a pixel color. The Display Processor 16 thus receives two-dimensional face descriptions from the Geometry Processor 14, along with the face color, and a face priority list, and uses this information to output the scene to color video display 18. Each color display in a system can be made up of 1,024 or more lines of video information and on each line there typically are 1,024 individual color dots or pixels (picture elements). Since there may be more than one million pixels in the display, and all of these need to be calculated in 1/60th of a second for a real-time image, the processing load in the Display Processor is very high. For each pixel the display may receive a 12 bit red data signal, a 12 bit green data signal, and a 12 bit blue data signal as part of intensity information that describe the color of the pixel.

Figure 2:
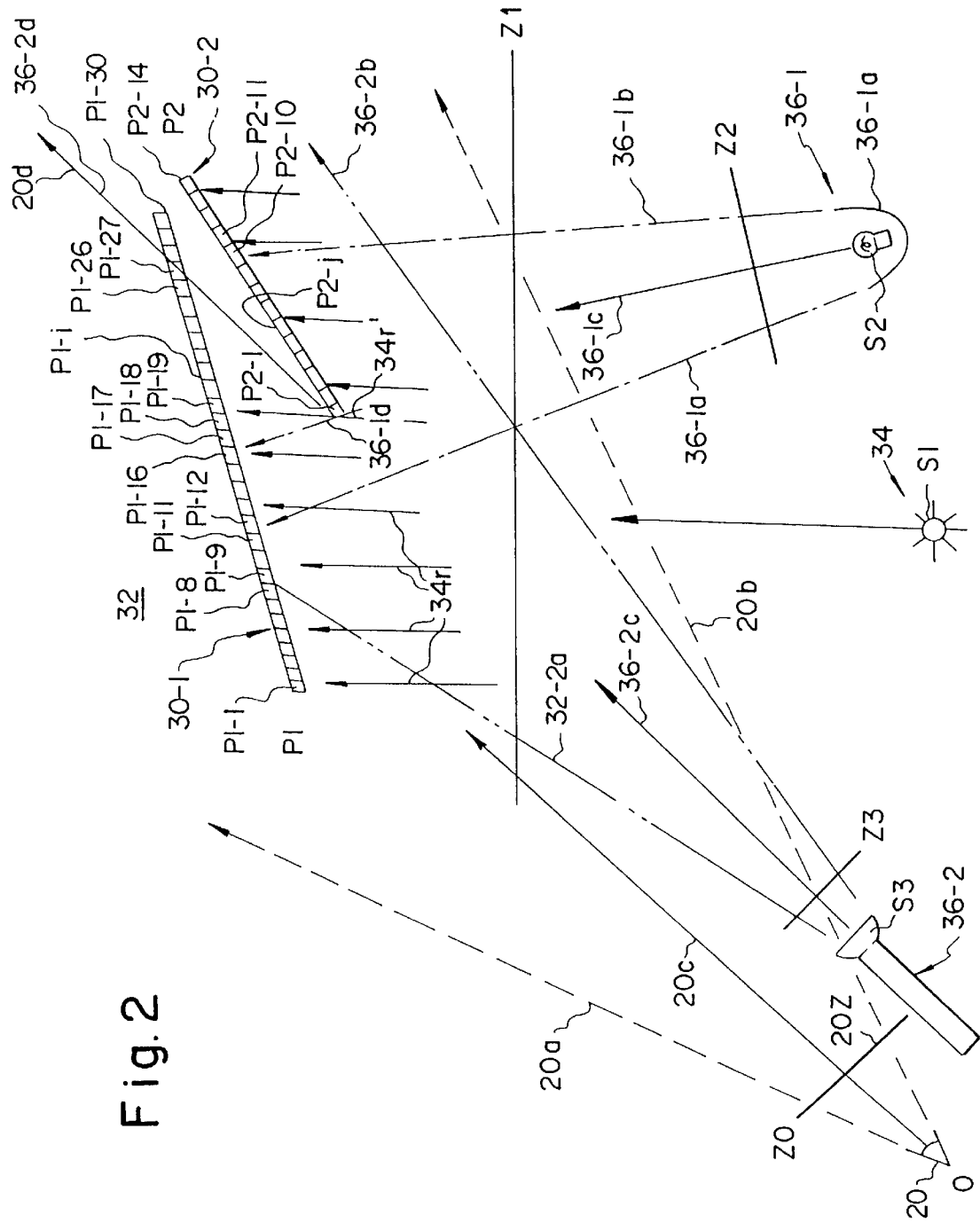
FIG. 2 is a spatial diagram illustrating the relationship between a plurality of light sources illuminating several object surfaces and an observer, and useful in understanding the principles of the present invention.

Referring now to FIG. 2, a computer-generated display is to show a plurality of generally 2-dimensional polygons 30, which are arranged in a 3-dimensional volume 32, and are to be viewed from the location O of observer 20. To facilitate comprehension, a 2-dimensional representation of volume 32 is shown, with only two polygons P1 and P2 being present; it should be understood that each polygon extends in a plane passing into and out of the plane of the drawing, so that only the one-dimensional line of the polygon-plane/drawing-plane intersection is shown for each of first P1 polygon 30-1 and second P2 polygon 30-2. It should be further understood that the observer 20 and the observed objects (polygons) 30-1, 30-2 may all be in the same space (e.g., object space, image space, and the like) or may each be in different spaces (e.g., the observer in image space, the polygons in object space, etc.) with suitable transformations (e.g., translation, rotation and the like) being used, in well-known manner, to interrelate the necessary visual relationships. Thus, observer 20 will view a screen array of pixels, each representing one picture element of all objects 30 visible in a display window opened between a first (lefthand) side limit 20a and a second (righthand) side limit 20b of the scene, as seen with a scenic center line 20c. The CIG unit has, in well-known manner, a Z-buffer means 16b associated with processor 16 (FIG. 1) for performing a depth-buffering operation, as indicated by placement of a Z0 plane 20z across the display window: while the visible display will include all of the pixels P2-j, where $1 \leq j \leq 14$ here, associated with the visible portions of the illustrative polygon 30-2, only some of the pixels P1-i, where $1 \leq i \leq 30$ here, of the illustrative polygon 30-1 are visible to observer 20. Thus, the observer view ray 12d passing the left corner of polygon 30-2, at element P2-1, delimits the portion (P1-1 through P1-26) of polygon P1 which will be viewable by the observer and the portion (P1-27 through P1-30) of polygon P1 which is behind the lefthand portion of polygon P2, from the observer's location, are hidden and not represented in depth buffer means 16b and are thus not displayed because such pixels (p1-27 thru P1-30) are not visible by observer 20.

In order for any of the polygon elements P1-1 thru P1-26 and P2-1 thru P2-14 to actually be seen in the display scene projected to the observer, that pixel must receive illumination from at least one light source. A distant-natural source S1, such as the Sun in the day, or the Moon at night, may be present, and, because of the great distance of such source 34 from the illuminated objects, effectively provides a set of parallel rays 34r, all passing through the scene in the same direction, governed by the source S1 location with respect to the object polygons 30. It will be noted that rays 34r impinge upon much, but not all, of the object polygon elements P1-i and P2-j; the polygon P2 closer to source 34 blocks passage of rays 34r' rightward of pixel P2-1, so that there is no S1 illumination of a portion (pixels P1-19 thru P1-30) of the farther polygon, which does, however, have pixels P1-1 thru P1-18 fully illuminated (at common intensity L1) by source S1. It will be understood that other far sources 34 may be present, to a total limited only by the capability of the CIG system in use, with each source 34 having an individual illumination extent and intensity which must influence the total illumination for each display pixel.

Other sources 36, relatively near to the polygons and generally 'man-made' in origin, can be present; a spotlight 36-1 has a source S2 directed by a reflector (not shown) into a cone of illumination, with boundaries 36-1a and 36-1b, about a directional center line 36-1c. For purposes of explanation, we will treat source 36-1 as having a constant intensity L2 within the cone, but no illuminative effect outside the cone (i.e. the illumination of source S2 on pixel P1-11, and other P1 pixels farther to the left, is effectively zero, as is the illumination on pixels P2-11 thru -14; pixels P1-12 thru -16 are fully illuminated at intensity L2 (but pixels P1-17 thru P1-30 are not, due to shadowing by the P2 polygon, as indicated by ray 36-1d). Display pixels P2-1 thru P2-10 forming the second polygon are also fully L2 illuminated. Similarly, another light source 36-2 may be a flashlight S3 carried by the observer/ownship and having its own cone of light delimited by edges 36-2a and 36-2b, about illumination centerline 36-2c. Again, edge taper and illumination profile effects are ignored and source S3 is shown as having zero illumination to the left of line 36-2a, so that no S3 light is received by pixels P1-1 thru -8, full illumination (of magnitude L3) within the cone is received by pixels P1-9 thru P1-26 (with pixels P1-27 thru -30 being shadowed by polygon P2) and by all of the P2 polygon pixels P2-1 thru P2-14.

It will be seen that, if we assign a saturation level of L=1.00 and, for purposes of illustration let L1=0.8, L2=0.6 and L3=0.3, then in the illustrative scene, pixels P1-1 thru P1-8 (region A) are illuminated only by source S1 and receive intensity L1; or $L_{total}$=0.8. With the addition of an additional source the light intensity increases; normally, illumination by a few sources would use a simple method of adding the respective intensity values together to arrive at the total value. Pixels P1-9 thru P1-11 are illuminated by both S1 and S3, so that additive $L_{total}$ would be 1.1, which is beyond the saturation value; this region (region B) is in saturation, at L=1.00. Pixels P1-12 thru P1-16, as well as second polygon pixels P2-1 thru P2-10, are illuminated by all three sources L1, L2 and L3, for $L_{total}$ of 1.7; these regions (Regions C and G) are also saturated at L=1.00. The region D of pixels P1-17 and P1-18 receive L1 and L3, but L2 is blocked and we say this region D is in L2-shadow; the $L_{total}$ is 1.1, or saturated at L=1.00. Pixels P1-19 thru P1-26 directly receive L3 but polygon P2 blocks the other sources, so that this region E is in L1-shadow and in L2-shadow; $L_{total}$=L3=0.3 (assuming zero additions for shadows). Similarly, pixels P1-27 thru -30 are shadowed for all three sources and L=0 in this region F. The second polygon pixels P2-11 thru P2-14 are illuminated only by sources S1 and S3, so that $L_{total}$=1.1, but this region H is saturated at L=1.00. Thus, it will be seen that, while regions A, E and F are respectively illuminated at intensities of 0.8, 0.3 and 0, the remaining regions are all saturated and at the same intensity, even though several different sets of illumination conditions are present. It will be seen that the simple additive model breaks down when more than a few light sources are present and their values must be added together. This is especially true when the source intensities add to a value higher that the greatest intensity allowable; illumination saturates and does not give a physically realistic effect for multiple lights. Similar problems occur if a source (e.g. S3) is removed; say, in region C, the S1 and S2 sources are still present and the intensity remains saturated, so that no decrease is seen to occur when the source is removed. It is desirable to have some change in total illumination intensity for a change in the number of illuminating sources or their respective intensities. In many cases, additive intensities, with use of a gamma function for non-linearity correction, is used; this works well for low light levels, with relatively few sources. Even if the source light is broken down into color components (red/blue/green, or RGB) and color component processing is done, the foregoing saturation problems still occur.

COMBINATION of SOURCES without SATURATION

Referring to FIG. 3, in accordance with one aspect of our invention, where the RGB color intensity range of each source is normalized to lie between 0.0 and 1.0, the CIG processes the color-separated individual source illumination intensities Li, for i=1, 2, 3, . . . , n, where n is the maximum number of sources, to generate a resultant intensity $L_r$ according to:

$$L_r = \{1.0 - (1.0 - L1)(1.0 - L2)(1.0 - L3) \ldots (1.0 - Li)\}$$

or $$L_r = 1 - \prod_{i=1}^{n}(1.0 - Li),$$

where π is product.

Referring now to FIG. 3a, it is clear that no single source S1, of intensity L1 normalized between 0.0 and 1.0, can ever saturate (generate an intensity I1 greater than 1.0) illuminated region X. Using the example of L1=0.8, L2=0.6 and L3=0.3 for FIGS. 3b–3c, we prevent saturation in multiple source situations, as shown by the two-source example of FIG. 3b, which will have I1=L1=0.8<1.0 in region X and I2=L2=0.6<1.0 in region Y; region XY receives both source illuminations L1 and L2, and would have been saturated Ia=1.0 in an additive situation. By the method of the present invention, $$La = \{1.0 - (1.0 - 0.8)(1.0 - 0.6)\}$$
$$= \{1 - (0.2*0.4)\} = 0.92 < 1.0.$$

In the three-source example of FIG. 3c, I1=L1=0.8<1.0 in region X, I2=L2=0.6<1.0 in region Y and I3=L3=0.3<1.0 in region Z; regions XY, YZ, XZ and XYZ all receive more than one source illumination and, while area YZ would be Lb=0.9 under an additive scheme, the other areas would have been saturated I=1.0 in the additive situation. By the method of the present invention, in area YZ, Ib=Lb={1.0-(1.0-0.6) (1.0-0.3)}={1-(0.4*0.7)}=0.72<1.0. In area XZ, Ic=Lc={1-(0.2*0.7)}=0.86<1.0. In area XYZ, Id=Ld={1-(0.2*0.7*0.4)}=0.944<1.0. It will be seen that if all sources are themselves not saturating (i.e. each source intensity Ii is less than 1.00), then no combination of the several sources can result in saturation (i.e. $I_{total}$ is never 1.00). There is always some change due to source count/intensities change, giving a more realistic effect.

Figure 4A:
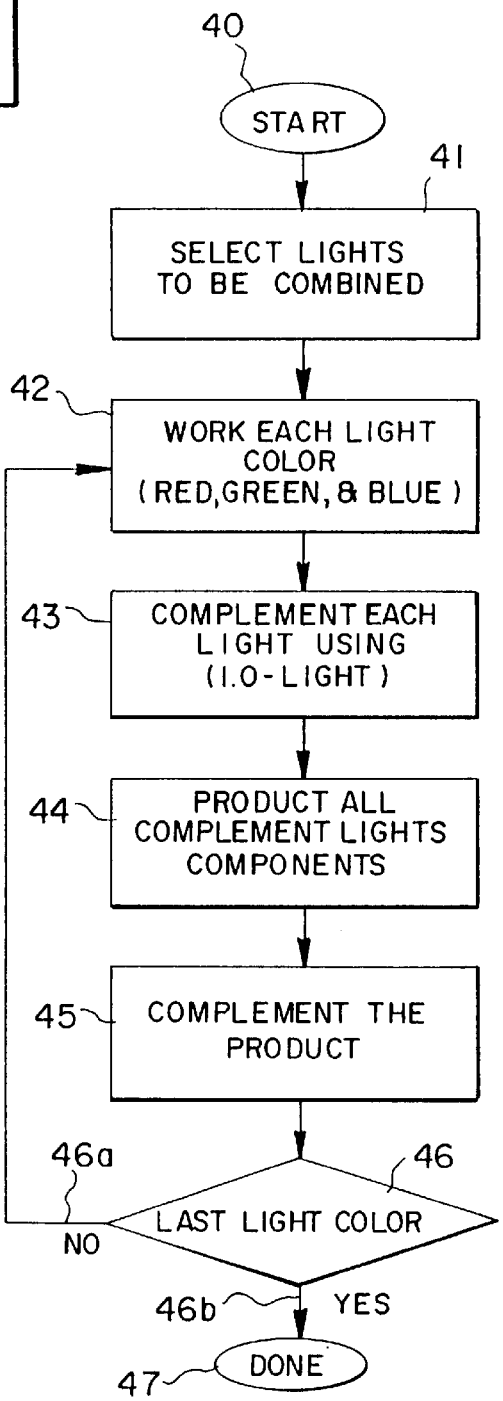
FIG. 4a is a flow chart of the basic plural-source illumination combination process in accordance with one aspect of the present invention.

The method for multiple source illumination is shown in the flow chart of FIG. 4a and starts, at step 40, with the input of the relevant light source characteristics (preferably as three-color R, G and B intensity data signals); in step 41 the actual lights used in the present scene are selected, and data characterizing the volumetric extent of each light source is acquired. Each color is treated separately, as the different sources can have vastly different color intensities. Step 42 is entered and work on a first (e.g. Red) one of the three colors commences; intensity normalization may take place here, if the data signals were not previously normalized into the 0.0 to 1.0 range. In step 43, each source light intensity $I_{c,s}$ of the selected color c and source number s, is one-complemented in intensity, to obtain complemented intensity $I'_{c,s}=(1-I_{c,s})$; that is, the one-complement of X is (1−X). The product of all of the one-complemented intensities is taken in step 44 and the data signal from step 44 is itself one-complemented in step 45, which is the resultant illumination Lr. Step 46 checks for further light colors to be processed; if all 3 colors have not been processed, exit 46a loops back to step 42, until all color intensities result in an exit 46b branch and step 47 signals completion of the multiple-source intensity operation.

Figure 4B:
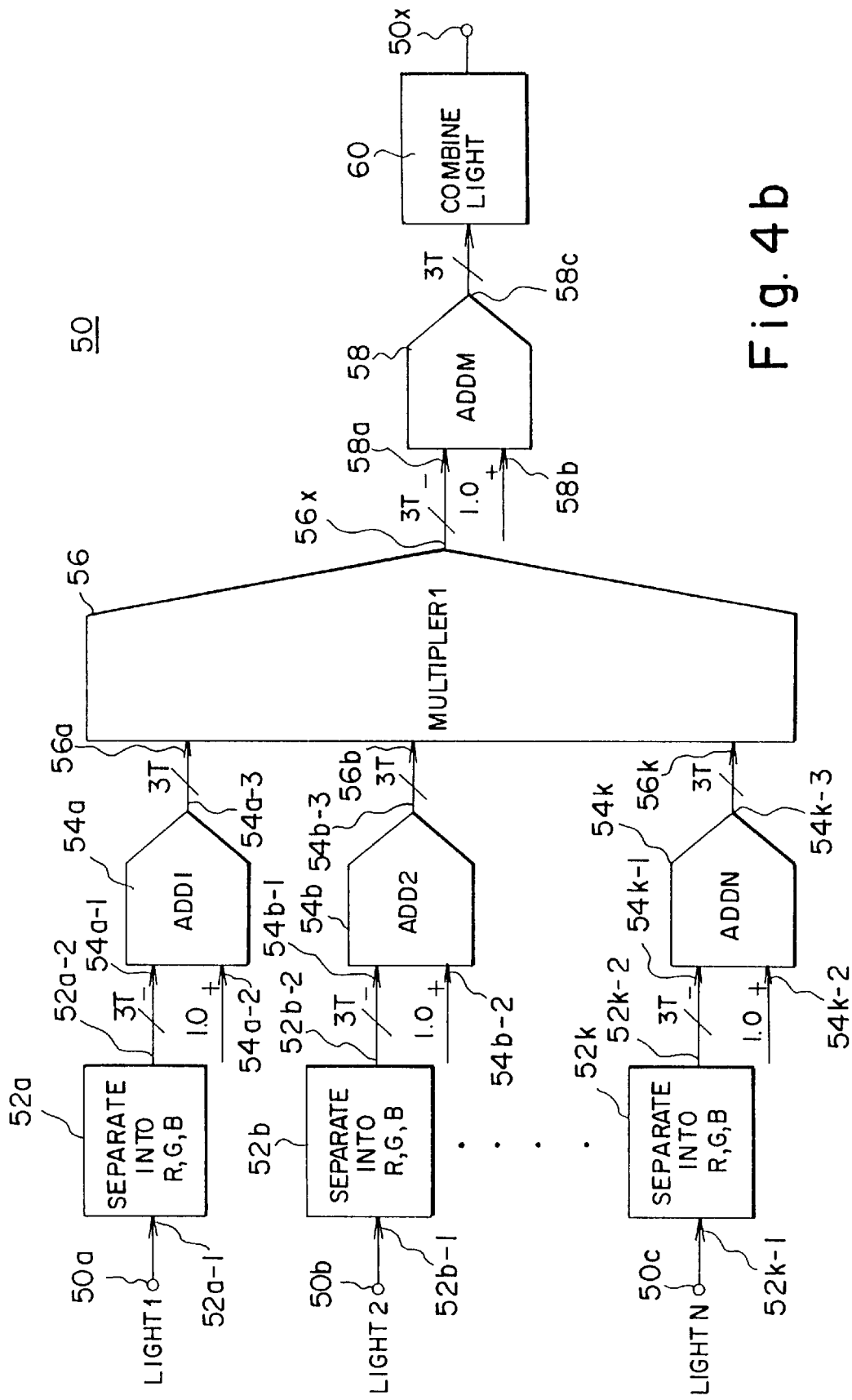
FIG. 4b is a block diagram of one multiple illumination source color intensity data processing unit, in accordance with the principles of the present invention, for use in a CIG display processor.

FIG. 4b illustrates one possible dedicated hardwired processor unit 50 for carrying out the aforementioned process. Each of the N light sources is characterized by an associated one of the N data signals input at the associated one of the unit N inputs 50a through 50n; these inputs are three-color light intensity Lk (for $1 \leq k \leq N$) data signals which are each provided to the associated input 52k-1 of the associated one of separation means 52k, where each Lk data signal is separated into a serial-bit-stream data signal for the sequential R/G/B color intensities of that Lk light, at the respective output 52k-2. The "3T" signals designate that three time-sequenced separate normalized color intensity portions follow one another. Each separated signal stream from an output 52k-2 is coupled in synchronized manner to an associated subtractive input 54k-1 of an associated one of N adder means 54k, all receiving a maximum normalized 1.0 value signal at a remaining input 54k-2. Each adder means output 54k-3 has the one-complement signal (1.0-Lk) thereat; each of the same-color one-complement signals for all of the N sources, is simultaneously applied to an associated one of the N inputs 56k of an N-input multiplier means 56. The multiplier means output 56x is a data signal S56x equal to the product $\{\pi(1-Lk)\}$ for all k, or S56x= (1.0-L1)*(1.0-L2)* ... *(1.0-Lk)* ... *(1.0-Ln), for that one of the three colors presently being processed. This data signal is applied to the first, or subtractive, input 58a of another adder means 58, also having the 'maximum 1.0' value applied to the remaining input 58b, to generate an output 58c data signal which is the time-sequenced desired non-saturating Lr signal. The three sequential color Lr signals are applied to the input of a light combiner means 60, which simultaneously provides the full RGB Lr signal at unit output 50x. Turning off any source Sk will, in a real-time CIG, remove the Lk intensity of that source from the calculations for the next frame of the display video.

LIGHT SOURCE REMOVAL for SHADOW GENERATION

Referring now to FIG. 3d, recalculation of the entire frame may be avoided, even if one source changes, as shut-off/removal of any one source Ss of the multiple source set of FIG. 3 can be removed by decreasing the combinational Lr' signal, in any area previously receiving the illumination of the removed source, in accordance with the process: Lr'={(Lr-Ls)/(1-Ls)}, where Ls is the intensity of the shutoff source and Lr is the previous resultant illumination intensity for all 'on' sources, prior to shutoff of source Ss. Thus, if the third source S3 flashlight is shut off, and L3 becomes zero, the triply-illuminated region XYZ which previously had Lr=0.944, will now set Ls=L3=0.3, so that Lr'={0.944-0.3)/(1-0.3)}={0.644/0.7}=0.92, which is, in fact the L value obtained for L1=0.8 and L2=0.6! Thus, simulating a shadow (i.e. causing the CIG to generate a shadow) is now no greater a process than removal of at least one of a plurality of sources from areas of selected polygons. It should be understood that, while the examples herein assume sharp dividing lines between 'binary' sources (i.e. the source either fully illuminates a pixel, with I=1.0, or does not at all illuminate a pixel, with I=0.0), the more general situation is a spatial variation across the normalized range of $0.0 \leq I \leq 1.0$ and additional calculations will be needed, in manner known to practitioner of the simulation arts.

Figure 1A:
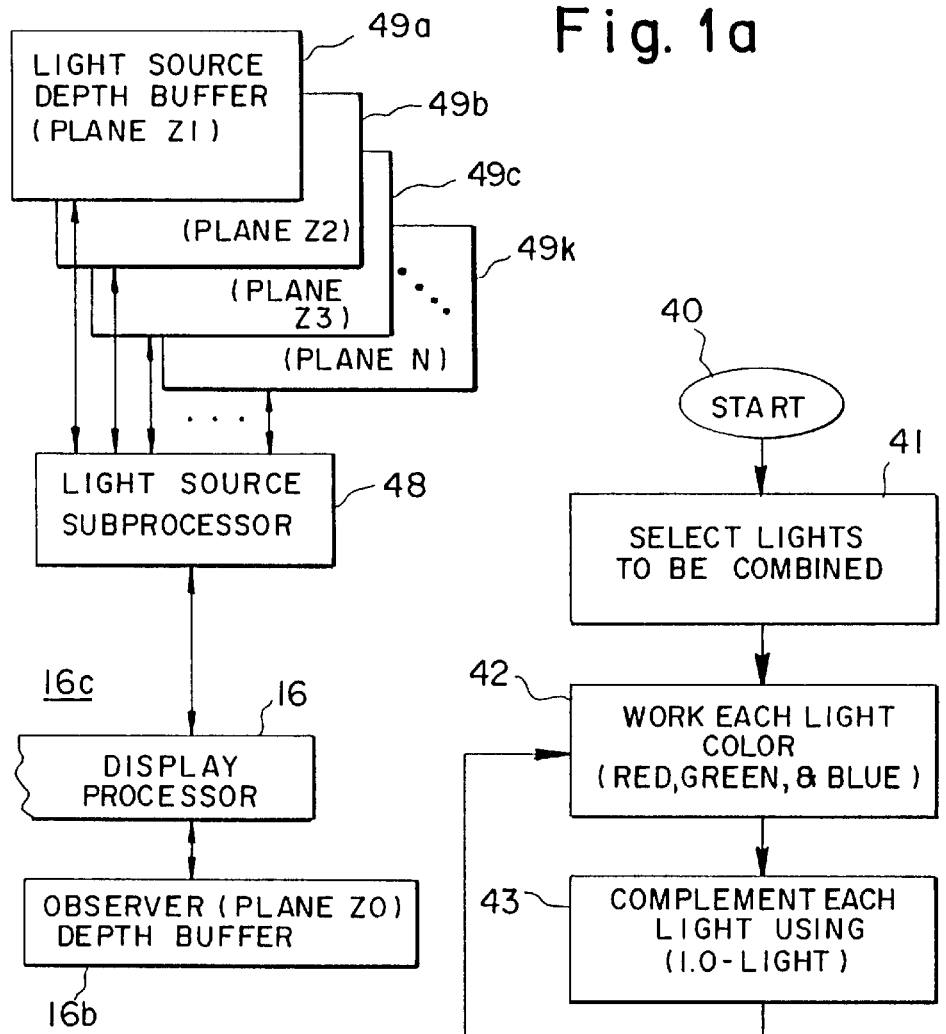
FIG. 1a is a schematic block diagram of multiple source illumination effects apparatus, in accordance with one aspect of the present invention, for inclusion in the system of FIG. 1.

Referring to FIG. 1a and again to FIG. 2, the display processor 16 has the wellknown-to-the-art depth/Z buffer 16b provided for the observer (which depth/Z buffer 16b operates by storing, for a pixel-designate Z0 plane 20z, the designation of the one visible pixel at each location of the image space pixel array, found by a comparison process, to be nearest to observer 20). This depth buffer is accessed for each pixel of the observer-visible display scene, to remove the necessity for processing all pixels not visible by the observer in a present scene, for rendering of each scene. In accordance with another aspect of the present invention, shadowing of the visible pixels is produced by a shadowing apparatus 16c, which includes a light source subprocessor 48 for providing to the display processor data signals determining the total illumination intensity Lr for each observer-visible pixel in the Z0 plane, by reference to that pixel location in each of separate depth (or Z) buffers 49 for each of the plural light sources. Thus, the natural far source S1 has an associated Z buffer 49a, represented (FIG. 2) by a Z plane Z1, which plane is orthogonal to the direction of the rays 34r of the first source S1; the data stored for each pixel location of the first-source depth buffer 49a will designate which polygon pixel is illuminated from the point-of-view (POV) of that source. As an example, in the illustrative scene, first light source depth buffer 49a stores data signals indicative of source S1 illuminating first polygon pixels P1-1 thru P1-18 (as designated by the ray 34r' just passing the left edge of polygon P2, which is nearer to the associated source) and all of second polygon pixels P2-1 thru P2-14; first polygon pixels P1-19 thru P1-30 are shadowed by the P2 pixels nearer to the S1 source and these pixel designations would not be stored in the Z1 buffer array. For any illumination calculations, subprocessor 48 receives the previously-determined scanned sequence of observer-visible polygon pixels (P1-1 to P1-26 and P2-1 to P2-14) and sequentially refers each to the Z1 buffer array 49a to determine which pixels (P1-1 to P1-18 and P2-1 to P2-14) are visible to the first source POV to add the S1 illumination, and which pixels not in line of sight of S1 to have withheld the illumination of this source from those pixels (P1-19 to P1-26) which are visible to the observer but are shadowed with respect to the particular source 34. Similarly, a second source S2 depth buffer 49b stores data signals with respect to an array plane Z2 which is provided orthogonal to the second source illumination direction (along vector 36-1c) and to the extent designated by the user for the particular source; it should be noted that the non-directional source S1 can use a full-frame buffer, as every point in image space is potentially lit, while a directional source S2 may only need a partial-frame buffer array, because less than the whole image plane is potentially lit. Thus, source S2 has a Z-buffer 49b representing orthogonal plane Z2, which stores the second-source-visible pixels, e.g. pixels P1-12 thru P1-16 (limited at that extent by the ray 36-1d denoting that nearer polygon P2 is shadowing the remainder of the first polygon pixels P1-17 thru P1-30) and P2-1 thru P2-10; the Z2 depth-buffer array does not store either pixels P1-1 thru P1-11, as these pixels are beyond the lefthand illumination pattern edge, or pixels P2-11 thru P2-14. as these pixels are beyond the righthand edge of the source pattern. Similarly for the flashlight S3 source, having its own associated source depth-buffer 49c with a Z plane Z3 orthogonal to the source vector 36-2c, the subprocessor operates with only a limited array to store the pixels seen from the S3 POV; these pixels include P1-9 thru P1-26 (but do not include either the pixels P1-1 thru P1-8, which are beyond the illumination pattern edgeray 36-2a, or the pixels P1-27 thru P1-30 which are shadowed by P2, as indicated by ray 36-2d) and all of the P2 pixels P2-1 thru P2-14, being inside the pattern, as shown by edgeray 36-2b.

In summation of the shadow buffer aspect of this invention, in any case of source simulation using this method, a separate depth buffer 49$i$, where $1 \leq i \leq N$, is preferably provided for each source Si to be shadow-buffered and the image is viewed from the POV of that source Si, i.e. looking in the direction of the source vector from the source location; the individual location in the orthogonal shadow depth buffer 49$i$ array plane Zi is filled with a polygon pixel designator indicating the nearest polygon pixel, if that pixel is "lit" (i.e., is impinged upon by a source Si ray), but the source buffer plane Zi location will instead be filled with a null indication if a pixel is not lit (i.e., if no pixel is viewable at that array location). To determine if the observer 20 sees a shadow, every time a pixel on any object polygon in plane Z0 is rendered by the observer's Z buffer 16$b$, subprocessor 48 must check for the presence of the same pixel in each of the source Z buffer 49$i$ planes Zi to determine whether or not that source Si can light that polygon pixel. When all sources of illumination for each pixel are found, the abovedescribed processing can be carried out to determine the total color intensity to be further processed for display. It will be understood that subprocessor 48 may be a separate data processor, such as a single-chip-microprocessor, or a process portion of the instruction set carried out by a larger, multi-tasking processing means. Similarly, the source depth buffers 49 may be at least one memory means, arranged in desired physical or virtual number or combination of planes, as required for the particular CIG system in use.

From the foregoing, it will be understood that simulation of any large extent/wide field-of-view (FOV) light source, like the natural-far Sun or Moon sources, can not be easily accomplished with a limited-extent Z-buffer 49, but requires a full-frame buffer for dynamic shadowing use. For Sun shadowing of a large image display, a depth buffer of many giga-elements extent can be required; this is not only volume consuming, but also quite costly. Yet, the observer will readily notice any failure to properly shadow moving objects and have trouble with such visual miscues. In accordance with another aspect of the present invention, a very cost-effective solution to the far (Sun) source lighting problem is to utilize texture maps for stationary objects and reserve a depth-buffer-based shadow simulator only for moving objects, in a manner so that the same value of illumination of objects inside and outside of the shadow buffer is obtained and no extra illumination signals are added to any part of the scene.

Figure 5A:
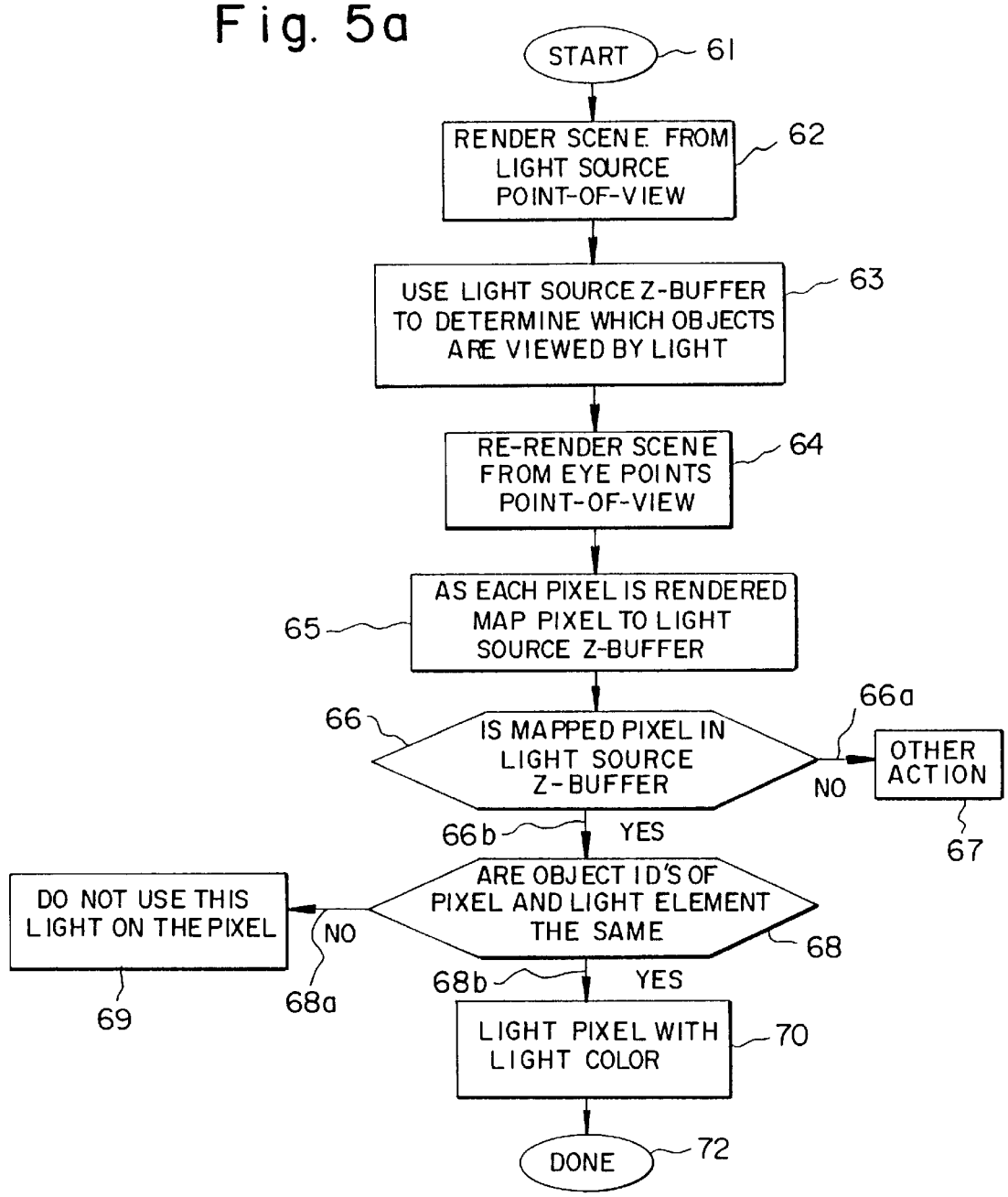
FIG. 5a is a flow chart of one shadow simulation process in accordance with another aspect of the present invention.

FIG. 5$a$ illustrates one logic flow capable of effecting the foregoing shadowing methodology: starting at step 61 with inputting of the data signals characterizing the polygons to be rendered in the present scene, step 62 is entered and, for the associated light source, the scene is rendered from the POV of that source and the source-visible pixels are stored in the source depth buffer (step 63). The scene is now rendered again, but from the observer's POV (step 64), and each pixel entered into the observer depth buffer is also checked (step 65), in turn, to determine if it is illuminated by the presently considered light source or if it is to be mapped as a shadowed pixel, with respect to that source (step 66). If the present display pixel is not shadow-mapped for the presently-considered light source, exit 66$a$ is taken and other action occurs (e.g., adding the illumination intensity of the present source to the total illumination for that pixel) in step 67; otherwise, exit 66$b$ leads to comparison step 68, where the identities of the source-lit pixel and object pixel are compared. If these are not the same, the display pixel is shadowed by the source under consideration, and exit 68$a$ leads to step 69, where the present light is not used to add illumination to the present display pixel (shadowed pixel); similarity leads to exit 68$b$ and step 70, where the present light source or the considered color component thereof) is used to light the present pixel and the display pixel illumination is increased accordingly. When all pixels of the present scene are so rendered and considered, the shadowing process is completed for that source and step 72 allows further processing to be done (either consideration of additional sources, or, once all sources are shadowed, anti-aliasing of lighted/shadowed areas).

FIG. 5$b$ illustrates one possible logic unit 80 for providing this processing. The data signals for the polygons to be rendered enter through input port 80$a$ and are coupled to the inputs of both the observer eyepoint depth buffer means 82 and the light source depth buffer means 84 (it being understood that only one source buffer 84 is shown, for reasons of simplicity, although a plurality of means 84 can, and normally are, used). Each depth buffer means 82/84 has its associated storage array means 82'/84', each with an output 82$b$/84$b$ from which data, as to the designation of the pixels visible from that POV, can be extracted and provided at an associated unit output 80$c$/80$b$. The observer data is also provided via output 82$c$ to a unit 86 for mapping the observer POV to the source; the resulting display pixel designation data signal is applied to a first input 88$a$ of a comparison unit 88, which also receives the source depth buffer output 84$c$ information, for the same display pixel, at another input 88$b$. If the observed pixel is, in fact, one of the pixels in the source buffer, the data is presented at output 88$c$, for introduction to a first input 90$a$ of another comparison unit 90. The second input 90$b$ of this comparison unit receives a shadow identity data signal from source depth buffer output 84$d$, and determines if the present pixel is in the shadow of the presently-considered light source. If so, the source and observer identities do not match and output 90$c$ presents lighting of that pixel by that source, i.e. the pixel is in a shadow with respect to that source. If there is a match of identities, there is no shadowing, and output 90$d$ is enabled. Output 88$d$ is connected to a first input 92$a$ of an adder means 92 (which may be based upon unit 50, see FIG. 4$b$), with a second input 92$b$ receiving the output. 90$d$ signal; the resultant illumination data signal at adder means output 92$c$ is presented to another observer depth buffer input 82$d$, to be stored as a partial-total of the illumination intensity for the present pixel. Once all of the scene pixels have been processed for all scene-illuminating sources, the observer buffer will hold the total illumination intensity data signal for each display pixel, including all shadowing effects.

Figure 6:
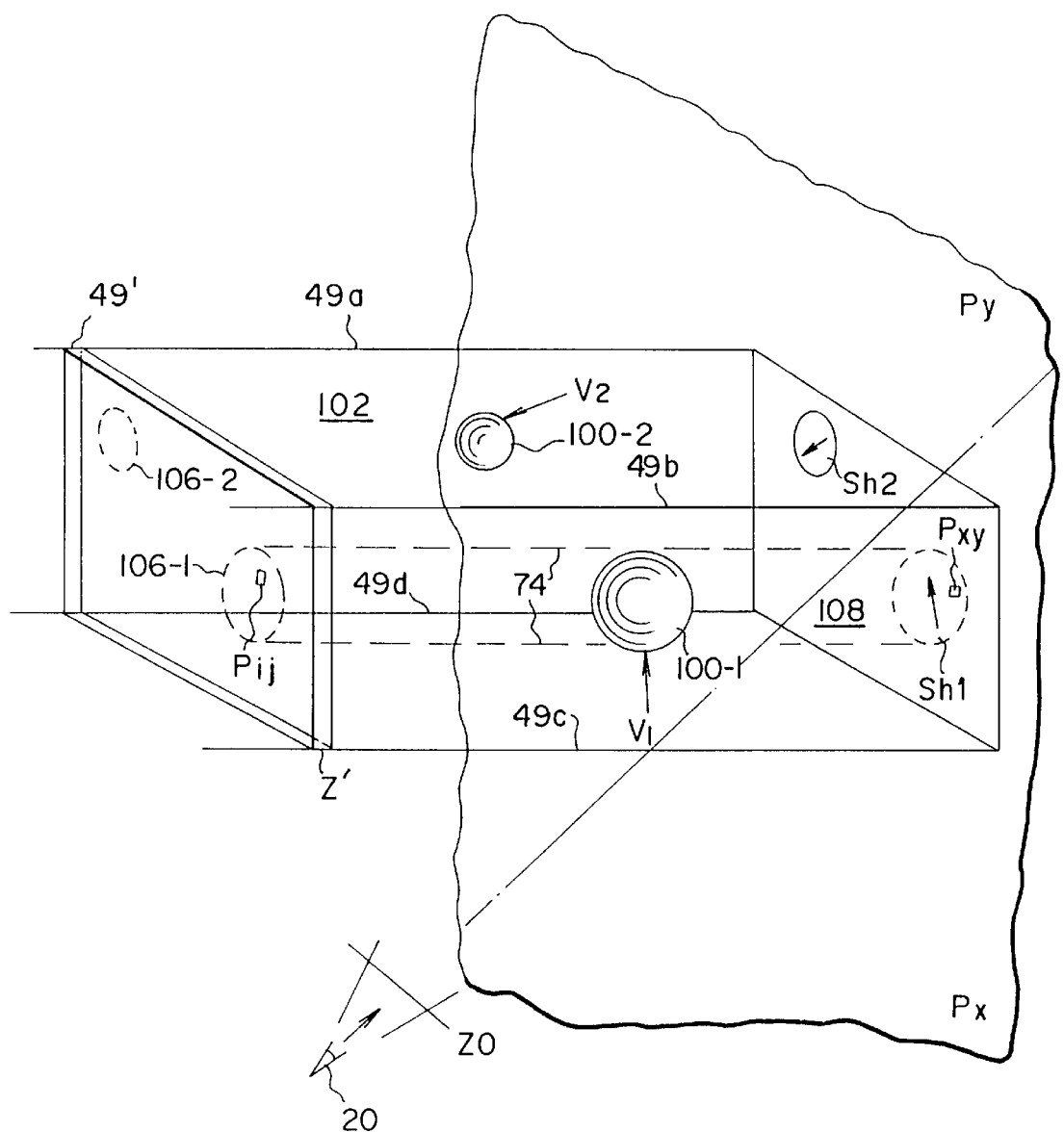
FIG. 6 is a perspective view of a portion of a natural-source (sun) z-buffer image plane, illustrating tracking use with a plurality of moving objects generating shadows.

Referring now to FIG. 6, the source depth buffer 49', associated with the large-extent source orthogonal plane Z', is set for coverage of the desired ones of a plurality R of moving objects 100$m$, where $1 \leq m \leq R$; illustratively, a pair of moving objects 100-1 and 100-2, respectively moving with velocity vectors V1 and V2, are to be shadowed. The velocity vectors Vm are not used by means 16$c$ for shadow calculations, as the moving objects locations are fixed and 'frozen' in each displayed scene, but may be used by prior computational means to predict where the tracked objects will be for each ensuing scene, whereby the size and location of the orthogonal z-buffer 49' plane Z' can be predetermined and prepositioned for moving objects tracking. The observer 20 depth buffer is still present, with plane Z0, and determines which polygons Px, Py, etc. have visible pixels in the display scene. Source buffer plane Z' is established so its corners define a set of source parallel rays 49$a$–49$d$ which encompass a volume 102 of space containing the objects 100$m$ to be shadowed. The parallel rays 104 within volume 102 establish the cells 106 in the depth buffer Z' plane which contain at least one data bit indicative of that cell containing a moving object (and generating a potential shadow Sh on the polygons visible by observer 20). Thus, as all rays within the volume 102 from the same source are parallel, the rays 104, defining the edges of the shadowing object 100, are parallel to the volume-edge rays 49a–49d, and establish not only the periphery of the depth-buffer plane locations (cells) 106 for that object (e.g. cell group 106-1 is designated for object 100-1 and group 106-2 for object 100-2, etc.), but also the shadow umbra volume(s) 108, between object 100 and the shadow Sh (e.g. shadow umbra Sh1 for object 100-1 and umbra Sh2 for object 100-2) on the polygon surfaces. The polygon pixels outside the buffer volume 102 thus all receive illumination from the source (not shown) associated with buffer 49'. The total set 106 of occulted locations stored in source depth buffer 49' is read to determine which light source plane image element Pij is outside the umbra 108 and thus is also receiving the associated source illumination. As the Z-buffer plane Z' locations are sequentially read, locations 106 are reached that define an element Pij within one of the umbras 108. For each of those Pij locations, that element is projected onto the polygons as an object pixel Pxy which is devoid of the illumination of the source associated with buffer plane 49'. The polygon pixel Pxy location is then checked in the observer Z-buffer plane Z0 to determine if that pixel would be visible to the observer 20. If the pixel Pxy is visible to observer 20, then the illumination of that source is removed and the shadowing process continues with illumination calculations that do not include contribution by the source associated with plane 49'; if the pixel Pxy is not visible, then the remainder of the calculation process is skipped and the next source plane 49' location is checked, until the entire set of moving-shadow buffer locations has been processed for each scene.

ANTI-ALIASING of SHADOWS

A number of CIG processes produce various artifacts and/or scintillation during the creation of a synthesized image. These anomalies may become particularly annoying at generated shadow Sh display areas, as a result of re-sampling a previously sampled polygon using the Z-buffer approach. That is, the image is viewed both from the POV of the observer 20 and the POV of the light source S, so that a polygon element is lit if it is 'seen' in object space by the light source if the element is not occluded or shadowed by other polygon elements nearer to the light source, but is also 'seen' in image space by the observer. To determine if the observer sees a shadow, every pixel rendered by the observer's Z-buffer must be checked in the light source Z-buffer, to determine if (and to what extent) that pixel receives the illumination of the associated light source. This multiple mapping and quantization at each point in the process tends to produce shadows that have annoying artifacts and very unnatural-looking shadows which just show an umbra and do not exhibit any penumbra. It is desirable to remedy these problems, by filtering the raw shadow umbra data, to generate shadows which are anti-aliased and have very smooth and natural shapes, with both umbra and penumbra (and preferably an adjustable degree of smoothness or blending).

Figures 7, 7A:
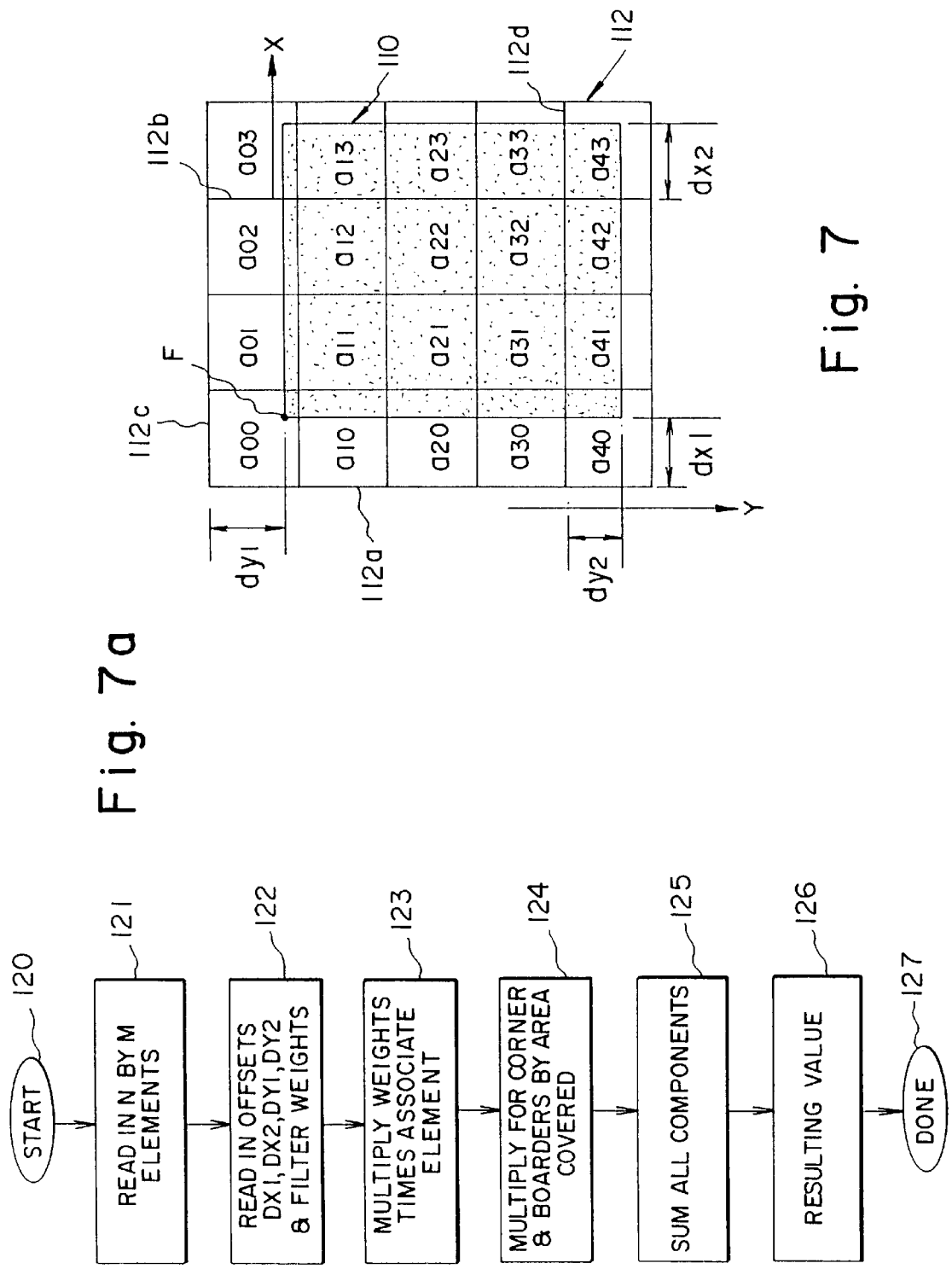
FIG. 7 is a diagram of a moving filter window for providing anti-aliasing in accordance with still another aspect of the present invention.
FIG. 7a is a flow chart of one implementation of the box-filter anti-aliasing process of FIG. 7.

FIG. 7 illustrates a two-dimensional moving-box filter having a pxq element filter box 110 which continuously traverses and samples a discrete grid of values, such as the NxM element light source depth buffer plane 112, for performing a weighted-convolution of the plane's elements $a_{ij}$, where $0 \leq i \leq N$ is the horizontal row number and $0 \leq j \leq M$ is the vertical column number. The box filter 110 is of finite extent and only weighs those value points it overlays: any plane element completely covered is completely included in the convolution, while those plane elements at the box periphery which are not completely covered are adjusted based on the box outline coverage. Thus, the $a_{ij}$ elements of buffer plane 112 commence with element $a_{00}$ in the upper left corner, and the i value increase in the X direction, while the j value increases in the Y direction; all elements are of substantially identical size in the X direction (size dx) and in the Y direction (size dy). The filter box dimensions p and q can be any positive real numbers, but neither have to be equal nor integers (e.g. the illustrated filter box is approximately p=3.1 X units by q=4.8 Y units in area). The size of the box and the associated weights determine the amount of smoothing. As the box 110 continuously moves across the array of digital element values, the offsets dx1 and dx2 from the lefthand edges of the leftmost and rightmost covered element columns of the array (here, column edges 112a and 112b, respectively) are known from the dx size of the elements and the amount of continuous X movement, and the offsets dy1 and dy2 from the upper edges of the topmost and bottommost covered element rows (here, row edges 112c and 112d, respectively) are known from the dy element and the continuous Y movement. The shadow calculator (e.g. light source subprocessor 48 and the like) can determine the filtered intensity of a point F, at (dx1, dy1) in element $a_{00}$, from the sum $\sigma_F$, where $$\sigma_F = w_{11}{}^*a_{11} + w_{12}{}^*w_{12} + w_{21}{}^*a_{21} + w_{22}{}^*a_{22} + w_{31}{}^*a_{31} +$$
$$w_{32}{}^*a_{32} + dx2^*(w_{13}{}^*a_{13} + w_{23}{}^*a_{23} + w_{33}{}^*a_{33}) +$$
$$(1 - dx1)^*(w_{10}{}^*a_{10} + w_{20}{}^*a_{20} + w_{30}{}^*a_{30}) +$$
$$(1 - dy1)^*(w_{01}{}^*a_{01} + w_{02}{}^*a_{02}) +$$
$$(1 - dy1)^*(1 - dx1)^*w_{00}{}^*a_{00} + dy2^*dx2^*w_{43}{}^*a_{43} +$$
$$(1 - dy1)^*dx2^*w_{03}{}^*a_{03} + (1 - dx1)^*dy2^*w_{40}{}^*a_{40} +$$
$$dy2^*(w_{41}{}^*a_{41} + w_{42}{}^*a_{42}),$$

where $w_{ij}$ is a weighting coefficient selected to simulate a desired functional filter shape. The moving filter box 110 allows each pixel to be sequentially anti-aliased, in turn. The filter thus outputs a continuum of linear 2-dimensional sample estimates from a 2-dimensional array of blocks.

FIG. 7a shows a flow chart of steps for anti-aliasing processing using the box filter: the filter starts at step 120 and the current location of the pxq box is calculated, so that the NxM elements completely or partially contained below the box can be read into the filter memory (step 121). The offsets dx1, dx2, dy1 and dy2 are read into the processor, as are all of the $w_{ij}$ filter weighting coefficients (step 122). Each weight and its associated element value is multiplied together (step 123) and the weighted multiples for the corner and border elements, where less than a full element contribution occurs, are obtained in step 124. The sum of all weighted elements is then obtained in step 125 and the resulting anti-aliased value (step 126) is output (step 127) to the lighting processor for subsequent use.

Figure 7B:
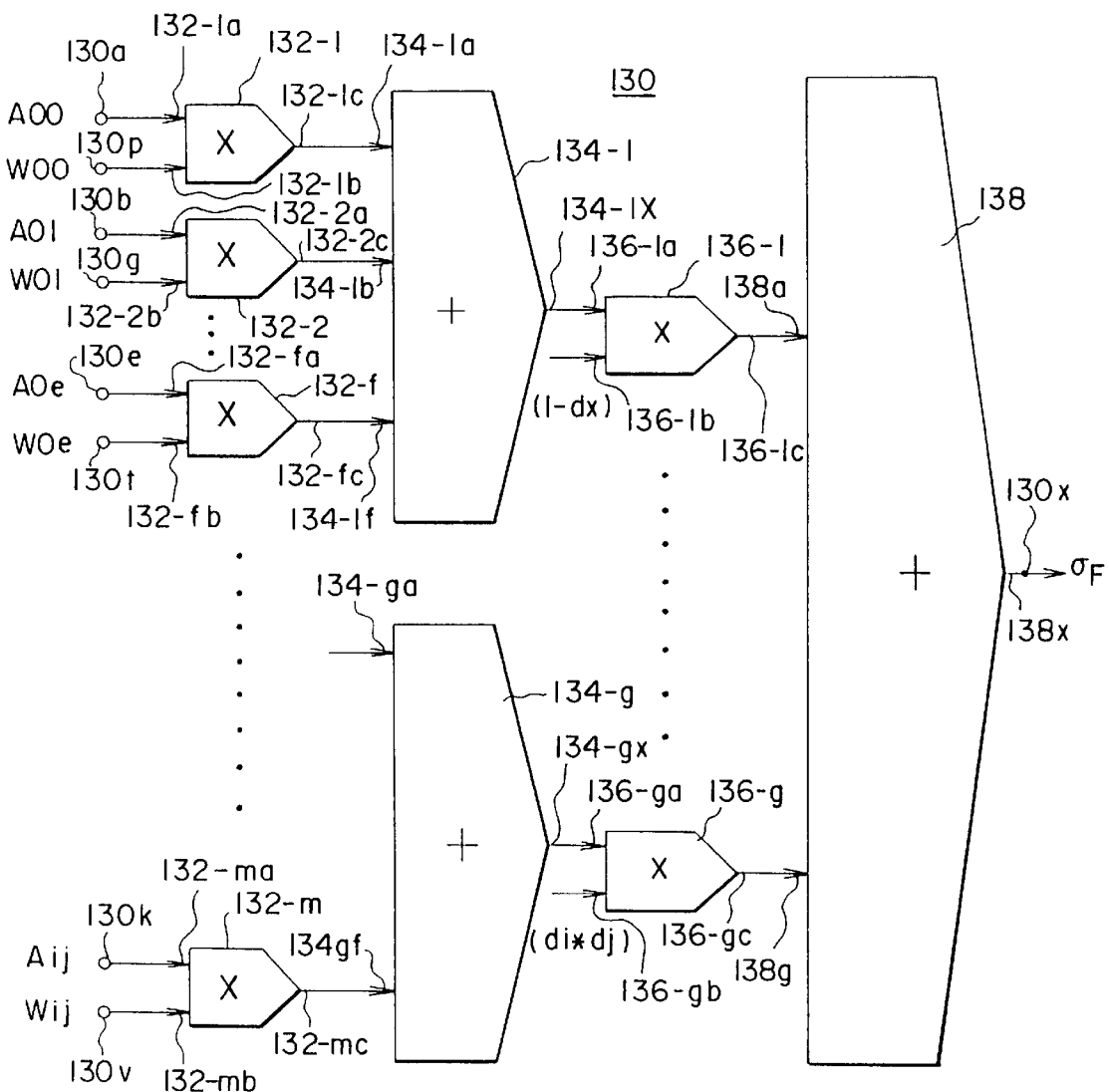
FIG. 7b is a block diagram of one box-filter anti-aliasing data processing unit, in accordance with invention principles, for use in a display processor.

FIG. 7b illustrates one logic unit 130 for performing the filtering task, should a preprogrammed processor not be utilized. The data signal for each element $a_{ij}$ (here, from $a_{00}$ to $a_{43}$) is applied to a corresponding one of inputs 130a–130k for connection to an associated first input 132-1a through 132-ma of the associated multiplier means 132-1 to 132-m, while the associated element weighting coefficient $w_{ij}$ data signal (here, from $w_{00}$ to $W_{43}$) is applied to the associated one of inputs 130p–130v and thence to the connected second input 132-1b to 132-mb of the first set of multipliers 132. Each of the weighted element products at outputs 132-1c to 132-mc are applied to associate input 134-1a through 134-gf of a set of first adder means 134, of number g and type determined by the number of weighted elements to be summed for a particular term one of the g terms in the required output. The first adder outputs 134-1x through 134-gx are individually connected to an associated first input 136-1a through 136-ga of a like number g of second multiplier means 136, each having a second input 136-1b through 136-gb, receiving an offset term data signal (specified by the various combinations of dx1, dx2, dy1 and dy2 necessary for the box to be filtered). The partial results are outputs 136-1c through 136-gc are then introduced at the g inputs of a second adder means 130, having an output 138x at which appears the weighted filter sum $\sigma_F$, for connection to unit output 130x and subsequent use as required.

While several presently preferred embodiments of the apparatus and methods for determining pixel color content in a computer image generator has been described in detail herein, many variations and modifications will now become apparent to those skilled in the art. It is therefore our intent to be limited only by the scope of the appending claims and not by way of the specific instrumentalities and steps presented by way of explanation herein.

What is claimed is:

1. A light source subassembly for use in a real-time computer image generator having depth buffer means associated with an observer's position for storing data signals representative of observer-visible polygon pixels, the subassembly comprising:

at least one additional depth buffer means associated with a different light source illuminating a scene to be displayed, for temporarily storing data signals representative of portions of the scene which are illuminated by the light source; and light processor means receiving the data signals from said at least one additional depth buffer means for adjusting proportionally an intensity of illumination on each pixel displayed to an observer of the scene responsive to each different light source forming the totality of light sources illuminating each pixel rendered by the observer depth buffer.

2. The light source subassembly of claim 1, wherein a plurality of separate light sources illuminate said scene, and further comprising depth buffer means associated with each different one of said plurality of light sources, for temporarily storing data signals representative of those portions of the displayable scene polygons illuminated by the associated light source.

3. The light source subassembly of claim 2, wherein said light source processor means utilizes data signals from all of said source depth buffer means to determine the total light intensity at each observer-visible pixel.

4. The light source subassembly of claim 2, wherein the light source processor means generates a non-saturating resultant illumination intensity data signal Lr from the totality of light sources illuminating each observer-visible display pixel.

5. The light source subassembly of claim 4, wherein N different light sources illuminate the display scene, and the data signal Lr is generated as substantially equal to the ones-complement of the product of ones-complement individual source intensity Li, for $1 \leq i \leq N$.

6. The light source subassembly of claim 5, wherein the processor means generates Lr={1−(1−L1)*(1−L2)* . . . *(1−Li)* . . . }.

7. The light source subassembly of claim 2, wherein said light source processor means also generates a continuously-moving pxq pixel array, where p and q are both positive numbers, for sequentially anti-aliasing each display pixel illumination.

8. A method for determining total illumination of each pixel to be displayed to an observer by a display means in a real-time computer image generator, comprising the steps of:

storing data signals representative of object polygon pixels visible to the observer in each pixel of the display;

storing data signals representing an illumination intensity received from a different light source by each polygon pixel viewable from that source; and generating an illumination intensity data signal for each display pixel visible to the observer, responsive to the stored light source illumination data signals, to obtain an illumination intensity having proportional contributions from said each different light source impingent upon each visible pixel.

9. The method of claim 8, wherein a plurality of separate light sources illuminate said scene, and further comprising the step of storing data signals representing an illumination intensity received from each separate light source by each polygon pixel viewable from the associated one of the plurality of light sources; said generating step also including the step of generating a total illumination intensity data signal for each display pixel visible to the observer, responsive to selected ones of the stored light source illumination data signals.

10. The method of claim 9, wherein said data signals from all of the plurality of light sources are used to generate the data signal for the total light intensity at each observer-visible pixel.

11. The method of claim 10, wherein the generating step includes the step of generating a non-saturating resultant illumination intensity data signal Lr from the totality of light sources illuminating each observer-visible display pixel.

12. The method of claim 11, wherein N different light sources illuminate the display scene, and the non-saturating data signal Lr is generated as substantially equal to the ones-complement of the product of ones-complement individual source intensities Li, for $1 \leq i \leq N$.

13. The method of claim 12, wherein the processor means generates Lr={1−(1−L1)*(1−L2)* . . . *(1−Li)* . . . }.

14. The method of claim 13, wherein shutoff of a j-th source generates a new resultant intensity Lr' related to the illumination intensity Lj of the j-th source and the original resultant intensity Lr, by Lr'=(Lr−Lj)/(1−Lj).

15. The method of claim 9, further comprising the step of providing depth buffer means for separately storing a set of the observer-visible pixels and an addition set of source-visible pixels.

16. The method of claim 15, wherein a set of source-visible pixels for each individual one of the plurality of light sources is separately stored in an associated one of a like plurality of depth buffer means.

17. The method of claim 16, wherein the spatial extent of any one source depth buffer is limited responsive to the associated light source illuminating less than an entire scene frame.

18. The method of claim 9, further comprising the steps of: generating a pxq pixel array, where p and q are both positive numbers; and continuously moving the array across the observer frame to sequentially anti-alias the illumination to each display pixel.

19. A light source subassembly for use in a computer imaging system having depth buffer means associated with an observer's position for storing data signals representative of observer-visible polygon pixels, the subassembly comprising:

at least one additional depth buffer means associated with a different light source illuminating a scene to be displayed, for temporarily storing data signals representative of portions of the scene which are illuminated by the light source; and light processor means receiving the data signals from said at least one additional depth buffer means for adjusting proportionally an intensity of illumination on each pixel displayed to an observer of the scene responsive to each different light source forming the totality of light sources illuminating each pixel rendered by the observer depth buffer.

20. The light source subassembly of claim 19, wherein the light source processor means normalizes intensity range of said each different light source to lie between 0.0 and 1.0.

21. The light source subassembly of claim 19, wherein the light source processor means generates a non-saturating resultant illumination intensity data signal $Lr$ from the totality of light sources illuminating each observer-visible display pixel.

22. The light source subassembly of claim 21, wherein N different light sources illuminate the display scene, and the data signal $Lr$ is generated as substantially equal to the ones-complement of the product of ones-complement individual source intensity $Li$, for $1 \leq i \leq N$.

23. The light source subassembly of claim 22, wherein the processor means generates $Lr=\{1-(1-L1)*(1-L2)* \ldots *(1-Li)* \ldots \}$.

24. The light source subassembly of claim 19, wherein said light source processor means also generates a continuously-moving pxq pixel array, where p and q are both positive numbers, for sequentially anti-aliasing each display pixel illumination.

25. A method for determining total illumination of each pixel to be displayed to an observer by a display means in a computer imaging system, comprising the steps of:

storing data signals representative of object polygon pixels visible to the observer in each pixel of the display;

storing data signals representing an illumination intensity received from a different light source by each polygon pixel viewable from that source; and generating an illumination intensity data signal for each display pixel visible to the observer, responsive to the stored light source illumination data signals, to obtain an illumination intensity having proportional contributions from said each different light source impingent upon each visible pixel.

26. The method of claim 25, wherein the generating step includes the step of normalizing intensity range of said each light source to lie between 0.0 and 1.0.

27. The method of claim 25, wherein the generating step includes the step of generating a non-saturating resultant illumination intensity data signal $Lr$ from the totality of light sources illuminating each observer-visible display pixel.

28. The method of claim 27, wherein N different light sources illuminate the display scene, and the non-saturating data signal $Lr$ is generated as substantially equal to the one-complement of the product of ones-complement individual source intensities $Li$, for $1 \leq i \leq N$.

29. The method of claim 28, wherein the processor means generates $Lr=\{1-(1-L1)*(1-L2)* \ldots *(1-Li)* \ldots \}$.

30. The method of claim 29, wherein shutoff of a j-th source generates a new resultant intensity $Lr'$ related to the illumination intensity $Lj$ of the j-th source and the original resultant intensity $Lr$, by $Lr'=(Lr-Lj)/(1-Lj)$.

31. The method of claim 25, further comprising the steps of:

generating a pxq pixel array, where p and q are both positive numbers; and continuously moving the array across the observer frame to sequentially anti-alias the illumination to each display pixel.

32. The light source assembly of claim 19, wherein the computer imaging system is a real-time system.

* * * * *